J. L. SHROYER.
ELECTRIC COOKER.
APPLICATION FILED SEPT. 19, 1919.
1,378,566. Patented May 17, 1921.
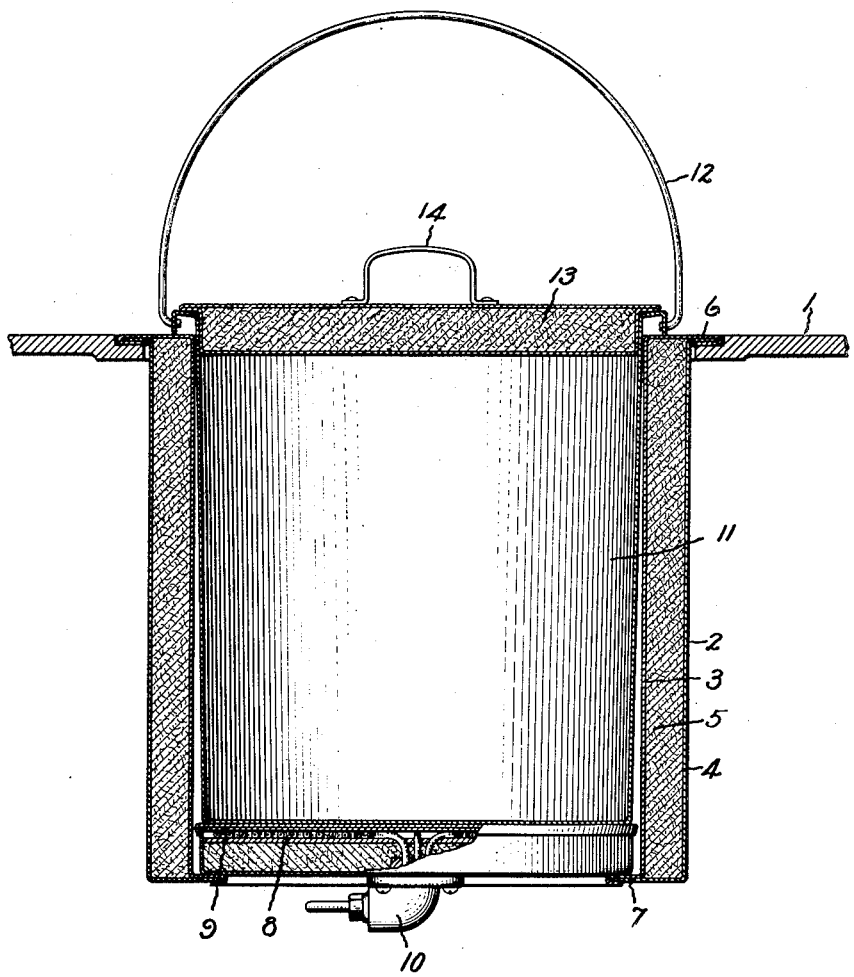
Inventor:
Jacob L. Shroyer,
by
His Attorney.

UNITED STATES PATENT OFFICE.

JACOB L. SHROYER, OF OAK PARK, ILLINOIS, ASSIGNOR TO GENERAL ELECTRIC COMPANY, A CORPORATION OF NEW YORK.

ELECTRIC COOKER.

1,378,566.　　　　Specification of Letters Patent.　　Patented May 17, 1921.

Application filed September 19, 1919. Serial No. 324,902.

*To all whom it may concern:*

Be it known that I, JACOB L. SHROYER, a citizen of the United States, residing at Oak Park, in the county of Cook, State of Illinois, have invented certain new and useful Improvements in Electric Cookers, of which the following is a specification.

My invention relates to electric heaters and has for its object the provision of an improved device of this character which will be of simple and compact construction, convenient of assembly and inspection and reliable and efficient in operation.

My invention relates more specifically to electrically heated cooking utensils such as vegetable cookers which are used in connection with electric ranges. Such cooking utensils are ordinarily heat insulated so as to keep the food in a utensil warm by preventing heat radiation, and are sometimes provided with means for heating the same. One of the objects of my invention is to provide a device of this character which is simple of construction and provides a convenient means for the removal of the heating unit and the inspection and cleaning of the utensil. Other objects and purposes of my invention will appear in the course of the following specification in which I have shown my invention in concrete form for purposes of illustration.

In the accompanying drawing illustrating one embodiment of my invention, 1 represents a range top to which my cooking device which is commonly referred to as a vegetable cooker, is applied. Fitted into an opening in the range top is a heat insulating casing 2, which in this particular case is cylindrical in form. This casing, as shown, is formed with a double wall 3 and 4 of metal with the intervening space filled with heat insulating material 5. The inner and outer metallic walls are joined at the top and bottom to form flanges 6 and 7. Flange 6 is for supporting the casing on the range top and flange 7 is for supporting the bottom element of the compartment. This bottom element consists of a flat heating unit 8 having on its inner surface a sheet of metal so that it will radiate heat inward. Its outer surface is heat insulated. To this end the element is composed of the heat insulating disk which, as shown, is composed of metal walls filled with insulating material, to the inner surface of which is secured the electric heating element. The heating element is preferably covered by a metallic sheath 9 so that the heating unit proper is inclosed. This bottom element rests upon a flange 7, as shown, and is provided with a terminal 10 for receiving the attaching plug. As shown, this heating unit is arranged to provide for three heats in a well understood manner.

The cooking utensil proper 11 consists of a metallic container, such as an aluminum can, provided with a lifting bail 12. This container has a flat bottom which rests on the top of the heating element, as shown, and may be readily removed by the bail 12, which bail is adapted to be turned down parallel with the top of the range, so that all the parts will be substantially at the level of the range top. A heat insulating cover 13 is provided to snugly fit into the container. This cover is shown in the same way that the other heat insulating parts are, that is, it is composed of a metallic casing filled with heat insulating material. A handle 14 is provided for this cover.

It will be seen that my invention provides a very compact and efficient arrangement, the parts of which may be easily manufactured and assembled. The bottom, containing the heating unit may be easily removed for inspection and the cooking utensil proper may be of a standard design and readily removed for cleaning purposes.

While I have described my invention as embodied in concrete form and as operating in a specific manner in accordance with the provisions of the patent statutes, it should be understood that I do not limit my invention thereto as various modifications thereof will suggest themselves to those skilled in the art without departing from the spirit of my invention the scope of which is set forth in the annexed claims.

What I claim as new and desire to secure by Letters Patent of the United States, is:—

1. A cooker for ranges and the like comprising a cooking utensil having a heat insulating cover, a heat insulating bottom for the utensil having a heating unit in heat conductive relation therewith and a heat insulating casing surrounding the utensil and coöperating with the cover and the bottom to completely inclose the utensil.

2. A cooker for ranges and the like comprising a heat insulating compartment, a flat heating unit heat insulated on one surface forming the bottom of said compartment, a cooking utensil fitting into the compartment and contacting with the uninsulated surface of the heating unit and a heat insulating cover for the utensil.

3. A cooker for ranges and the like comprising a heat insulating compartment, a flat heating unit heat insulated on one surface removably mounted on the bottom of said compartment to form the bottom thereof, a cooking utensil fitting into the compartment and contacting with the uninsulated surface of the heating unit and a heat insulating cover for the utensil.

4. A cooker for ranges and the like comprising a heat insulating compartment, a flat heating unit heat insulated on one surface removably mounted on the bottom of the compartment to form the bottom thereof, a cooking utensil provided with a lifting bail fitting into the compartment and contacting with the uninsulated surface of the heating unit and a heat insulating cover for the utensil.

5. A cooker for ranges and the like comprising a heat insulating compartment, a flat heating unit insulated on one surface and movably mounted on the bottom of said compartment with the uninsulated surface inward to form the bottom thereof, a cooking utensil fitting into the compartment and a heat insulating cover for the utensil.

6. A cooker for ranges and the like comprising a heat insulating compartment, a flat heating unit insulated on one surface and movably mounted on the bottom of said compartment with the uninsulated surface inward to form the bottom thereof, a cooking utensil fitting into the compartment and substantially closing the top thereof and a heat insulating cover for the utensil.

In witness whereof, I have hereunto set my hand this fifteenth day of September, 1919.

JACOB L. SHROYER.